(12) United States Patent  
Brady et al.

(10) Patent No.: US 7,478,645 B2
(45) Date of Patent: Jan. 20, 2009

(54) HOT AND COLD HYDRANT WITH SWIVEL OUTLET

(75) Inventors: Scott Brady, Grandview, MO (US); Joe Poskin, Grandview, MO (US)

(73) Assignee: Prier Products, Inc., Grandview, MO (US)

( * ) Notice: Subject to any disclaimer, the term of this patent is extended or adjusted under 35 U.S.C. 154(b) by 175 days.

(21) Appl. No.: 11/358,780

(22) Filed: Feb. 21, 2006

(65) Prior Publication Data

US 2007/0193636 A1 Aug. 23, 2007

(51) Int. Cl.
*F16K 11/18* (2006.01)
*E03B 9/02* (2006.01)

(52) U.S. Cl. ............... 137/270; 137/272; 137/360; 137/606; 251/151

(58) Field of Classification Search .......... 137/270, 137/272, 360, 606, 301; 251/148, 151
See application file for complete search history.

(56) References Cited

U.S. PATENT DOCUMENTS

| 924,041 | A | * | 6/1909 | Corlew | 251/148 |
| 1,504,623 | A | * | 8/1924 | Hulla | 137/270 |
| 1,916,553 | A | * | 7/1933 | Bersted | 137/270 |
| 2,134,966 | A | * | 11/1938 | Boscow et al. | 137/606 |
| 3,175,575 | A | * | 3/1965 | Kennedy | 137/360 |
| 5,158,105 | A | * | 10/1992 | Conway | 137/360 |
| 5,964,246 | A | * | 10/1999 | Meeker | 137/360 |
| 6,206,039 | B1 | * | 3/2001 | Shuler et al. | 137/606 |
| 6,857,446 | B1 | * | 2/2005 | Hoeptner, III | 137/218 |

* cited by examiner

*Primary Examiner*—Stephen M Hepperle
(74) *Attorney, Agent, or Firm*—Mark Manley

(57) ABSTRACT

A freezeless hot and cold outdoor hydrant having a hot water inlet and a cold water inlet and a single water outlet elbow. The hydrant has a hydrant body including a mix cavity chamber. The single water outlet is swivel mounted to an end of said hydrant body such the hydrant can be mounted in a vertical orientation with the hot and cold water inlets above the outlet or the hydrant can be mounted in a horizontal orientation with the outlet swiveled approximately 90 degrees and with the hot and cold water inlets horizontally oriented beside the outlet. Two horizontal orientations are possible, depending upon the swivel angle of the outlet elbow. One horizontal orientation has the hot water operator on the left side of the hydrant and the other horizontal orientation has the hot water operator on the right side of the hydrant.

14 Claims, 5 Drawing Sheets

HOT AND COLD HYDRANT WITH SWIVEL OUTLET

RELATED APPLICATIONS

None

BACKGROUND OF THE INVENTION

In the water hydrant industry it is desirable to build outdoor hydrants that are easy to install, freeze proof and that can prevent undesirable flows such as backflow where contaminated water from outside a hydrant might flow back into the hydrant and the hydrant water supply. There is also a need for an outdoor hydrant that provides hot and/or cold water.

U.S. Pat. No. 6,206,039 discloses an anti-freeze outdoor hot and cold hydrant. In the U.S. Pat. No. 6,206,039 patent the water outlet 44 is placed between the hot and cold operators 40. In this arrangement the hydrant has only one correct orientation limiting the options an installer has for the hydrant. The operators 40 must be mounted side by side requiring a wide space for installation. Failure to install the hydrant in a side by side orientation would not only result in an odd looking hard to use hydrant but would also trap water in the cavity of the hydrant leading to freezing of the hydrant. Home owners and others may also not like the wide, side by side appearance. The check valve 46 allows water to escape from the hydrant body 28 to prevent freezing in cold weather. Because the check valve 46 is fairly large there is limited space for the operators 40 making them more difficult to operate. In some applications it may be necessary to have the inlet pipes to a hot/cold hydrant oriented vertically and in other applications a horizontal orientation may be required. Commonly, homes with basements will have the hydrant inlet pipes horizontal and slab homes without basements will require a vertical orientation of the hot and cold inlet pipe as the pipes will commonly come through, and be hidden within a standard 2×4 interior wall which is too narrow for the horizontal orientation. With prior art hot/cold hydrants it was necessary to have two separate products to satisfy the different applications, one hydrant was horizontal, the other vertical. This required a substantial investment in tooling and extra inventory for manufacturers supplying the hydrants.

U.S. Pat. No. 5,964,246 discloses a box mounted hydrant having an outlet 146 that swivels out of the box to allow for use. This box mounted type hydrant is fairly difficult to install and has only one correct orientation. While the single handle operator may solve some of the orientation and width problems of the prior art, it is not universally accepted for outdoor use.

As can be seen there is a need for a hot and cold outdoor hydrant that is easy to install and maintain.

SUMMARY OF THE INVENTION

The present invention relates to a freezeless hot and cold hydrant having a hot inlet and a cold inlet and a single outlet, the hydrant including elongated pipes connecting valves to hot and cold operators. The single outlet is mounted on the end of a hydrant body and can be swiveled by the installer such that the hydrant body can be mounted either horizontally or vertically. The hydrant further can have two horizontal orientations one with the hot on the left and one with the hot on the right. Again this result is achieved simply by loosening a nut to unlock an outlet elbow and swiveling the outlet elbow to the desired orientation. Alternate mounting arrangements give the installer or the end customer great choice in how they want the installation to appear and may help overcome obstacles particularly in retrofit applications. Specifically the hydrant can be installed in either a vertical or horizontal orientation, eliminating the need for manufacturers and suppliers to inventory two separate products. One hydrant can be used in either homes with basements or in homes built on a slab.

These and other advantages of the present invention will become apparent from the detailed description of the invention.

DETAILED DESCRIPTION OF THE DEVICE

Figure 1:
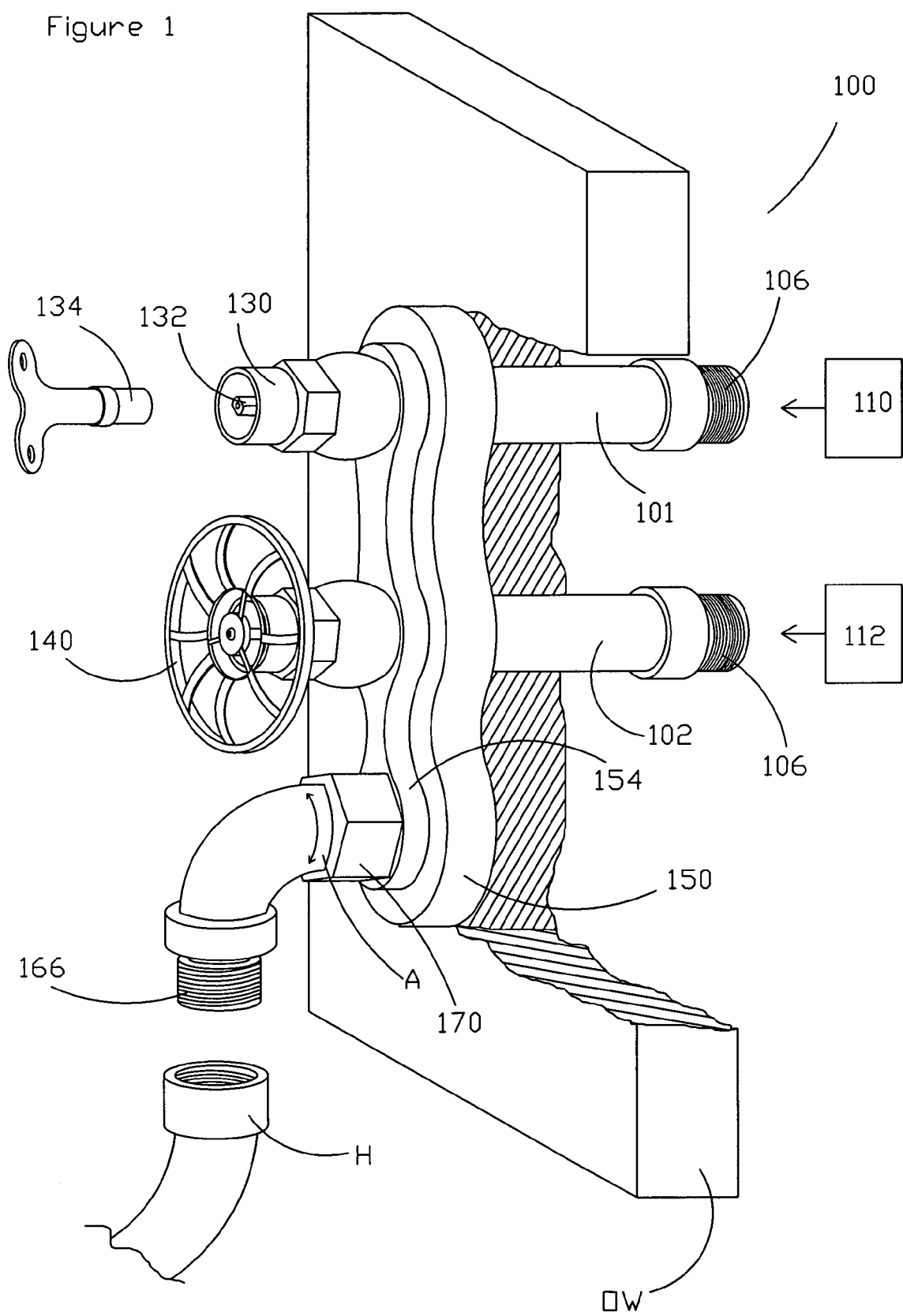
FIG. 1 shows an external view of the hydrant mounted in a wall in a first orientation.

FIG. 1 shows an external view of the hydrant 100. The hydrant 100 can include water inlet pipes 101 and 102 and a water outlet 104. The water inlet pipes 101 and 102 can include threads 106 to allow it to be connected to a source of water such as the plumbing of a structure. There can be a source of hot water 110 connected to inlet 101 and a source of cold water 112 connected to inlet 102.

FIG. 1 further shows that the hydrant 100 can include a hydrant control 130 including an operator end 132 and operator key 134 to be used to turn the operator end 132. The operator end 132 is used to turn the hydrant 100 hot water flow off and on. Having a key operator 134 on the hot side prevents accidental use of the hot water by a child for example. A second control 140 mounted adjacent the operator 130 controls the flow of cold water and includes a handle 142 such that turning the handle 142 can initiate the flow of water or turn in the opposite direction turns the flow of water off. The hydrant 100 includes a hydrant body 150 that includes a mix cavity 152 (see FIG. 2) within raised area 154. The hydrant body 150 includes an outlet 104. The outlet 104 includes a swivel mounted outlet elbow 160. The swivel mounted elbow 160 can be swiveled as indicated by arrow 'A' such that the hydrant 100 can be mounted in a vertical orientation as shown in FIG. 1 or the elbow 160 can be swiveled as indicted by arrow 'A' through an angle of about 90 degrees to allow the hydrant to be mounted in a horizontal orientation as shown in FIG. 3. The elbow 160 can include a check valve 162 that can allow water to flow out of the hydrant body 150, when the operators 130 and 140 are turned off, such that water will not be trapped a freeze during cold weather. To allow the cavity 152 to completely drain it is important that the threaded hose adapter 166 and water outlet end 164 of the elbow 160 be below the hydrant body cavity 152. As can be seen in FIGS. 1 and 3 the outlet end 164 is below the cavity 152 in either orientation (horizontal or vertical). The outlet end 164 can include threads 166 that allow it to be connected to a conventional garden hose 'H'. 'Complete draining' of the cavity 152 means that enough water has drained from the cavity to prevent damage to the hydrant or blockage of operation caused my freezing.

Figure 2:
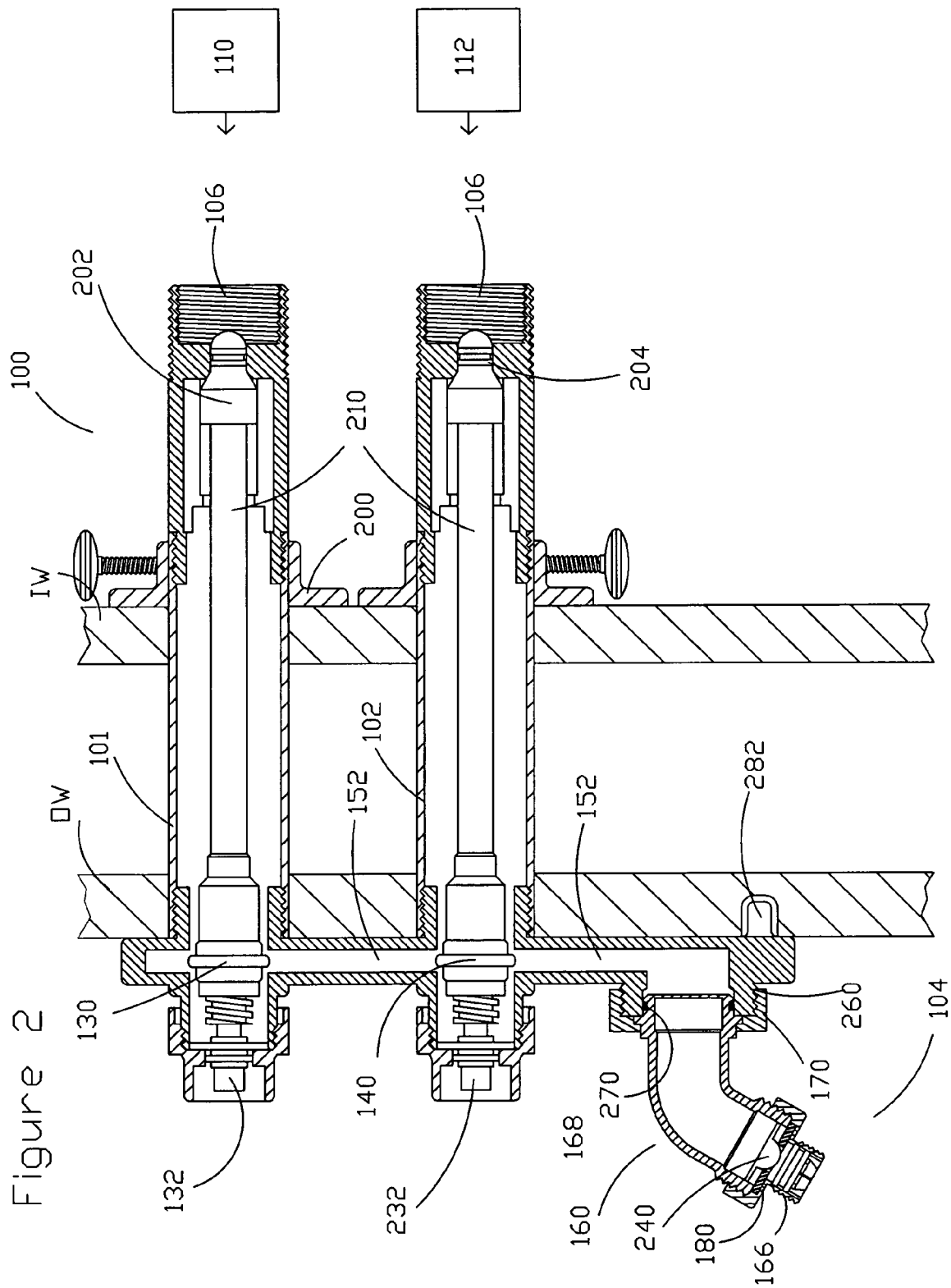
FIG. 2 shows a partial cross sectional view of the hydrant in the first orientation installed.
Figure 3:
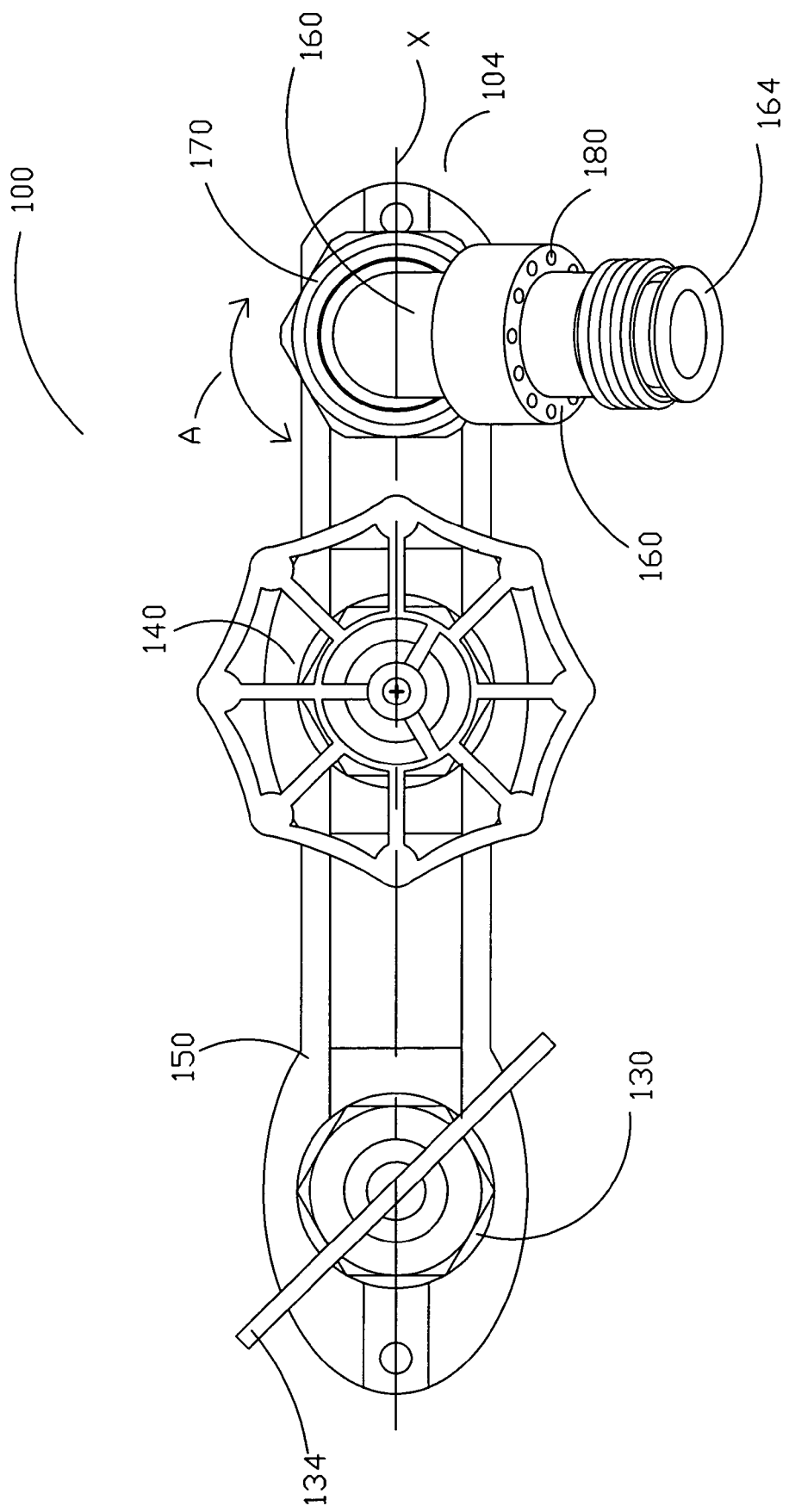
FIG. 3 shows a face on view of the hydrant in a second installation orientation.

FIG. 2 shows a cross sectional view of the hydrant 100 in the closed position. The hot water operator 130 and the cold water operator 140 are turned so that the seals 202 and 204 prevent flow of water from the hot water 110 and the cold water 112 sources. Each operators 130 and 140 can include an identical internal valve arrangement including an operator stem 210 long enough to reach through the outer wall 'OW' of a structure to prevent freezing of the seals 202 and 204. Each stem 210 can be connected by threads 214 such that when the operator ends 132, 232 are rotated the stems will move longitudinally to allow water to flow. As can be seen the cavity 152 permits water to flow from either operator 130 and 140 alone or if both seals 202 and 204 are open the hot and cold water will mix within the cavity 152. Vacuum breaker holes 180, best seen in FIG. 3, allow air to enter the hydrant 100 under siphon conditions. The vacuum breaker thus prevents the hydrant from siphoning water back into the hydrant 100.

The outlet 104 includes a swivel elbow 160. The swivel elbow 160 can include a shoulder 168 adapted to carry an 'O' ring 270 and sized to slip into the outlet 104. A nut 170 mounts over the shoulder 168 and connects to the hydrant body 150 at threads 260. When the shoulder 168 slips into the outlet 104 the 'O' ring 270 is slightly compressed sealing the elbow 160 to the hydrant body 150. Thus the nut 170 can be loosened and the elbow 160 can be turned to any angular orientation and the 'O' ring 270 will maintain a seal. The nut 170 can be tightened to lock the elbow 160 against movement or the nut 170 can be left loose enough to allow the elbow to swivel. The outlet 104 can be a circular opening in the hydrant body 150 surrounded by threads 260 and the shoulder 168 can be a cylindrical shape having a slightly smaller diameter than the outlet 104.

FIG. 3 shows the same hydrant 100 in a face on view. In FIG. 3 the nut 170 has been loosened and the outlet elbow 160 has been pivoted through angel 'A' of about 90 degrees when compared to the hydrant 100 as shown in FIG. 1. Pivoted as shown in FIG. 3, the nut 170 can be tightened to maintain the elbow 160 in this orientation for the hydrant 100 as horizontally mounted. In the horizontal orientation the hot operator 130, cold operator 140 and water outlet 104 are horizontally aligned as shown by horizontal line 'X'. The line 'X' also represents an edge on view of a plane that runs through the hot operator 130, cold operator 140, outlet 104 and the hot and cold inlet pipes 101 and 102. As indicated by angle 'A' the elbow 160 can pivot to any angle through 360 degrees of rotation. As shown in FIG. 3 the hydrant has the hot operator 130 on the left. The elbow 160 can be rotated through an angle 'A' of 180 degrees and the hot operator will be on the right. Thus the hydrant 100 has three normal mounting orientations, vertical with the hot operator on top as shown in FIG. 1; Horizontal with hot operator on left as shown in FIG. 3 and horizontal with hot operator on right. In each of the three mounting orientations the hydrant 100 still will drain when the operators 130 and 140 shut off water flow. The threaded outlet end 166 is always generally below the cavity 152 such that the cavity 152 can drain.

The hydrant has been shown with a nut 170 that allows the elbow 160 to be locked in any orientation including the horizontal or vertical orientation. Normally the nut would be locked when the hydrant was installed and would not normally need to be unlocked. The only reason to swivel the outlet elbow 160 normally would be to achieve the proper orientation of the outlet 160 and hydrant for installation. It would be possible to design the hydrant such that the nut could be left loose to allow the elbow 160 to swivel freely such as when a hose were pulled to the left or right. Having the elbow 160 swivel freely would prevent a hose from kinking at the elbow 160 when pulled to the left or right. This free swivel arrangement (not shown) might be more difficult to seal against leakage over time.

The hydrant is shown with a key operator 134 on the hot supply side and a conventional handle on the cold operator 140. It will be understood by those in the art that both operators could be handle operated or key operated as is known in the industry.

Figure 4:
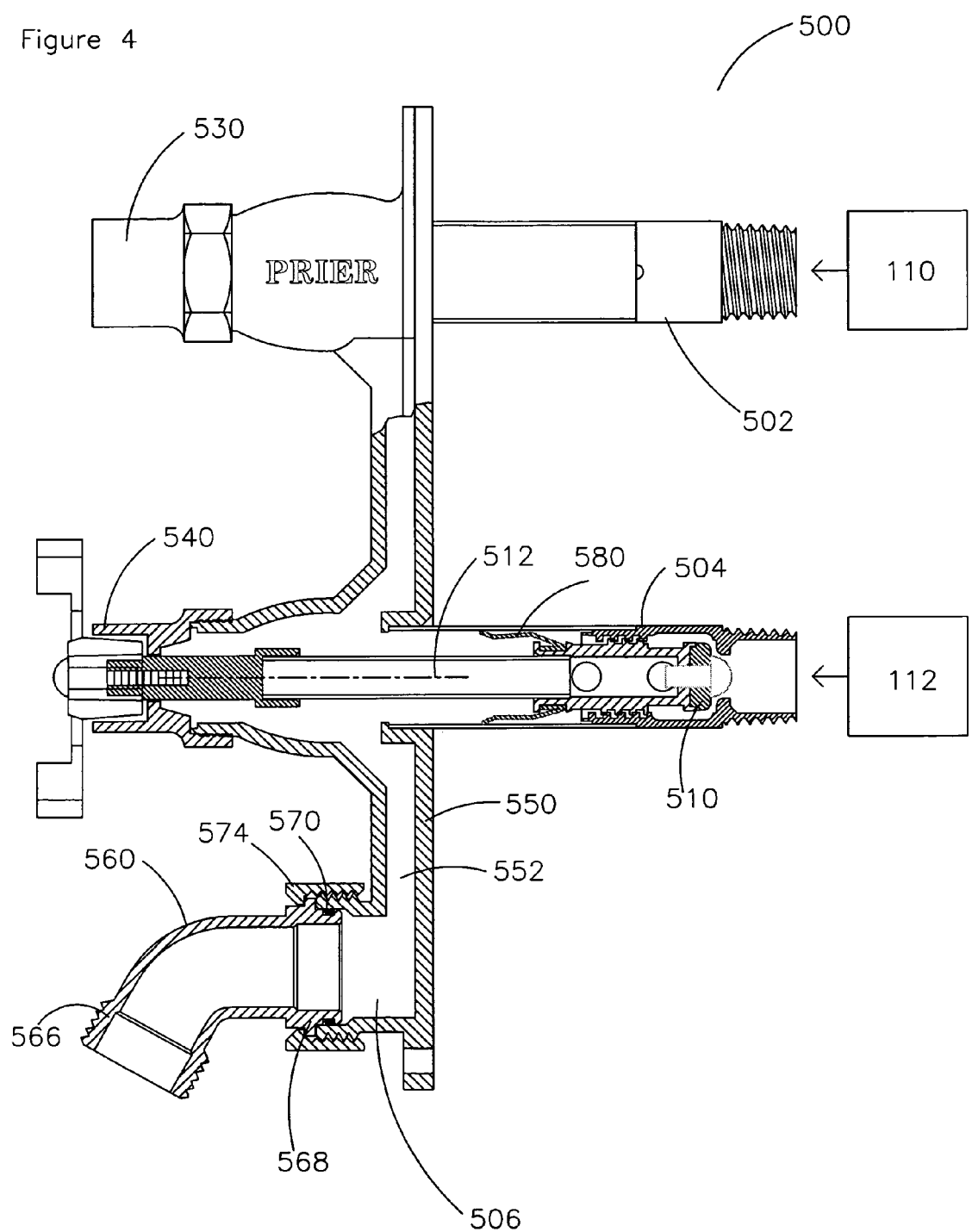
FIG. 4 shows a partial cross sectional view of an alternative embodiment of the concept.

FIG. 4 shows an alternative embodiment of the hydrant 500. The hydrant 500 receives hot water from a source 110 and cold water from a cold water source 112. Again the hot water operator 530 and the cold water operator 540 can be identical and are both attached to hydrant body 550. In FIG. 4 the cold water operator is shown in cross section. The cold water operator includes a handle 542 and a valve seat 510 at the end of an elongated stem 512 and pipe 504. The stem 512 and pipe 504 are long enough to prevent freezing of the valve seat 510 and of the source of cold water 112 in cold weather. When turned on, water from either or both operators 530, 540 flows into cavity 552 within the hydrant body 550. Water flows through outlet 506 in the hydrant body and into the swivel mounted outlet elbow 560. The elbow 560 includes a threaded outlet 566, a hose adapter to which a conventional garden hose can be attached for example.

The elbow 560 can include a shoulder 568 and a nut 574 that can engage the shoulder and threads 572 on the hydrant body outlet 506. When the nut 574 is tightened on threads 572 it is held to the hydrant body 550. An 'O' ring seal 570 can prevent leakage. When the nut 574 is loosened, the elbow 560 is free to swivel 360 degrees such that the hydrant 500 has three possible mounting orientations. The hydrant 500 can be mounted vertically as shown or horizontally with the hot operator 530 on the right or horizontally with the hot operator 530 on the left. As shown the hydrant 500 is a freezeless design. In cold weather water is free to drain from the cavity 552 and the valve seals are mounted so that they will be far enough into a wall to prevent freezing. To be a freezeless hydrant, the hydrant must be able to drain all the water in cavity 552. To completely drain cavity 552 the outlet 506 should be level with the operators 530, 540 as in the horizontal orientations or below the operators 530 and 540 as in the vertical orientation. The hydrant inlets 502 and 504 can include a flexible back flow preventer 580. The back flow preventer flexes to allow water to flow in from source 112 but tends to expand against the wall of inlet 504 if water attempts to backflow from the outlet 566 toward the inlet 112.

Figure 5:
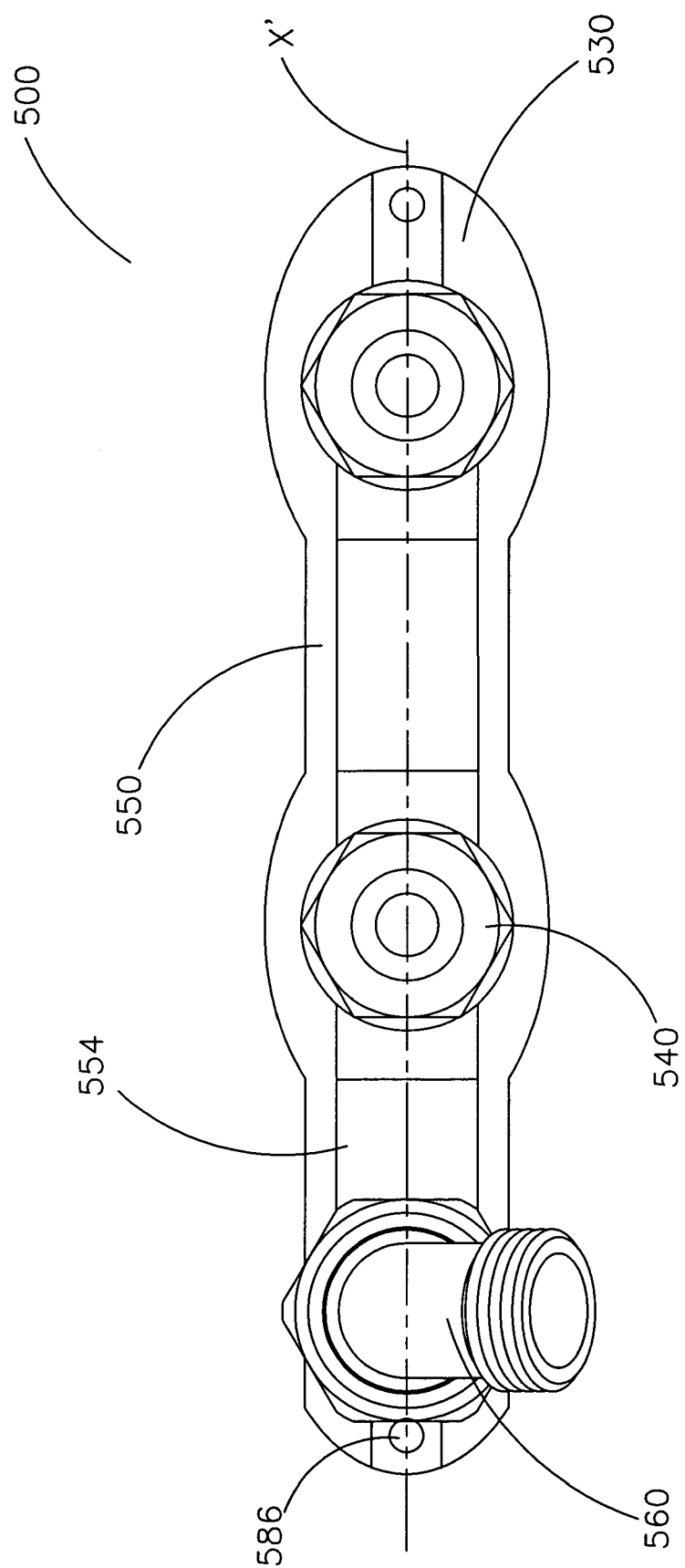
FIG. 5 shows a face on view of the second embodiment.

FIG. 5 shows a face on view of the second embodiment of the hydrant 500. In FIG. 5 the hydrant 500 is shown in the horizontal embodiment with the hot water control 540 in the left hand position and the cold water 530 on the right hand side. The elbow 560 can be turned 90 degrees for the vertical mounting shown in FIG. 4 and 180 degrees for a horizontal mounting with the hot water control 540 on the right. In all orientations the hot water control 540, cold water control and outlet 504 align along the linear axis X' which can be oriented to be horizontal or vertical. FIG. 5 shows that the hydrant body 550 which can be a metal casting for example, can have mounting holes 586 to aid in the installation of the hydrant 500.

The orientations discussed through out have been to mount the hydrant in either horizontal or vertical. Because the elbow swivels 360 degrees the hydrant can function as a freezeless hydrant at any angular orientation. It is felt that vertical and horizontal present the most conventional mounting arrangements from a visual point of view. In some applications it may be desirable to adjust the swivel elbow 560 and mount the hydrant 500 in another angular orientation such as 45 degrees to horizontal.

Though the hydrant 500 does not show a vacuum breaker it is well known in the art to thread a vacuum breaker to the hose adapter 566 end of a hydrant. Further though the swivel outlet is shown with hot and cold operators it would also be possible to have other arrangements that might include a single hot/cold operator. It would also be possible to mount the swivel outlet between the hot and cold operators.

The invention claimed is:

1. A freezeless hydrant having a hot water inlet and a cold water inlet and a single outlet, said hydrant including:
   a hydrant body,
   an elongated inlet pipe connecting a cold water valve to a cold water operator such that turning said operator allows a flow of cold water;
   an elongated inlet pipe connecting a hot water valve to a hot water operator such that turning said operator allows a flow of hot water;
   a water mix cavity connected to said hot water valve and to said cold water valve;
   an outlet, said outlet including a swivel mounted elbow such that said elbow can be rotated relative to said hydrant body to a first orientation where said cold water operator, said hot water operator and said outlet are aligned horizontally and a second orientation wherein said hot water operator, said cold water operator and said outlet are aligned vertically and wherein said water mix cavity can drain through said outlet in each orientation to prevent freezing.

2. The hydrant of claim 1 wherein said hydrant includes a vacuum breaker/check valve to prevent siphoning and backflow from a hose to said hydrant.

3. The hydrant of claim 1 wherein said swivel mounted elbow is rotatable through 360 degrees.

4. The hydrant of claim 1 wherein a hose adapter end of said swivel mounted elbow is below said cavity in either said first or second orientation such that said cavity can completely drain to prevent freezing of water in the cavity.

5. A freezeless hydrant having a hot water inlet and a cold water inlet and a single outlet, said hydrant including:
   a hydrant body,
   an elongated inlet pipe connecting a cold water valve to a cold water operator such that turning said operator allows a flow of cold water;
   an elongated inlet pipe connecting a hot water valve to a hot water operator such that turning said operator allows a flow of hot water;
   a water mix cavity connected to said hot water valve and to said cold water valve;
   an outlet connected to said mix cavity, said hydrant body having a first orientation where said cold water operator, and said hot water operator are aligned horizontally and a second orientation and wherein said hot water operator, and said cold water operator are aligned vertically and wherein said water mix cavity can drain through said outlet in each orientation to prevent freezing.

6. The freezeless outside hydrant of claim 5 including a nut to lock said outlet against movement relative to said hydrant body.

7. The freezeless outside water hydrant of claim 5 wherein said outlet includes an elbow including a hose threaded outlet.

8. The freezeless outside water hydrant of claim 7 wherein said elbow can be selectively locked in position against movement.

9. The freezeless outside water hydrant of claim 8 wherein said hot water operator is to a right side of said cold water operator in said horizontal orientation.

10. A wall mounted freezeless outside water hydrant having a hydrant body, said hydrant including;
    a first elongated inlet pipe connecting a first water valve inside said wall to a first water handle operator outside said wall such that turning said first water operator allows a flow of water;
    a swivel outlet mounted on said hydrant body;
    a hydrant cavity between said valve and said swivel outlet;
    wherein the hydrant body is mountable in a horizontal position with a handle operator beside the swivel outlet and a vertical position with the handle operator above the operator;
    wherein the swivel outlet is movable from a first position where said cavity will not drain to a second position where said cavity will drain to prevent water from freezing in said mix cavity
    wherein said first valve is a cold water valve and wherein a second valve supplies hot water to said hydrant cavity.

11. The wall mounted hydrant of claim 10 wherein in said horizontal position said first valve, said second valve and said outlet are in a horizontal plane and in said vertical position said second valve is aligned above said outlet.

12. The wall mounted hydrant of claim 10 wherein in said horizontal position said first valve, said second valve and said outlet are horizontally aligned and in said vertical position said first valve, second valve and said outlet are vertically aligned.

13. The wall mounted hydrant of claim 10 wherein said swivel outlet includes an elbow having hose thread.

14. The wall mounted hydrant of claim 13 including a nut surrounding at least a portion of said elbow and wherein said nut can lock said elbow against swivel movement.

\* \* \* \* \*